CONTROL CIRCUITS FOR LUMINOUS DISPLAY DEVICES

Filed Oct. 1, 1958

INVENTORS
GEORGE R. BRIGGS &
BY JAN A. RAJCHMAN
[signature]
ATTORNEY

United States Patent Office 2,897,405

Patented July 28, 1959

2,897,405

CONTROL CIRCUITS FOR LUMINOUS DISPLAY DEVICES

George R. Briggs and Jan A. Rajchman, Princeton, N.J., assignors to Radio Corporation of America, a corporation of Delaware Application October 1, 1958, Serial No. 764,602

7 Claims. (Cl. 315—250)

This invention relates to luminous display devices, and more particularly to transfluxor driving circuits for light emitting elements which require a relatively large voltage for operation.

One type of luminous display device may be made of a plurality of controllable light producing elements. Many types of displays may be presented on such a device ranging from simple block light patterns to commercial television images. An electroluminescent cell, which comprises a body of material that emits light in the presence of alternating electric fields of sufficient amplitude and proper frequency, is an example of a light emitting element that may be used with such a display device. One of the methods of energizing or driving an electroluminescent cell is by the use of a transfluxor device. The transfluxor is a ferromagnetic element and is described in an article on page 321 in the Proceedings of the Institute of Radio Engineers for March 1956, by J. A. Rajchman and A. W. Lo, entitled "The Transfluxor." However, when a transfluxor is used to control the voltage applied to an electroluminescent cell, which has a large capacitance, serious impedance mismatch between the electroluminescent cell and the transfluxor may occur, causing a considerable loss in power.

It is, therefore, an object of this invention to provide an improved circuit to control the brightness of a light producing element which requires high voltage for operation.

It is another object of the invention to provide an improved transfluxor control circuit for an electroluminescent light producing element to reduce the power consumed to control the brightness of the electroluminescent cell.

It is a further object of this invention to provide an improved transfluxor control circuit for a light producing element which requires only a single wire turn linking the output aperture of the transfluxor.

In accordance with the invention, a light emitting element is connected in series with an inductor, and the self capacitance of the element or an additional capacitance added to shunt the elements resonated, at the operating frequency of the power source to be used, with an inductive element. A transfluxor device is connected to control the application of a source of alternating power across the series combination of the light emitting element and the inductor. The source is required to supply only the power consumed in the effective resistance of the series resonant circuit, while at the same time a large voltage may be developed across the light emitting element to provide light output therefrom because of the circuit operating at resonance.

The invention may be better understood, however, when the following description is read in connection with the accompanying drawings, in which:

Figure 1 is a schematic circuit diagram of a transfluxor control circuit for an electroluminescent light producing element embodying the invention;

Figure 2*a* is a vector diagram of the voltage and current relations existing in the circuit of Figure 1 under one set of operating conditions;

Figure 2*b* is a vector diagram of the voltage and current relationships existing in the circuit of Figure 1 under a second set of operating conditions;

Figure 1:
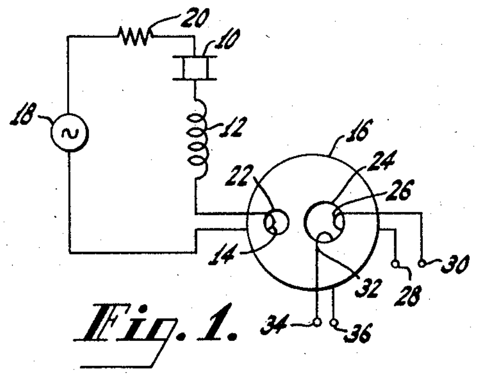
Figure 2A:
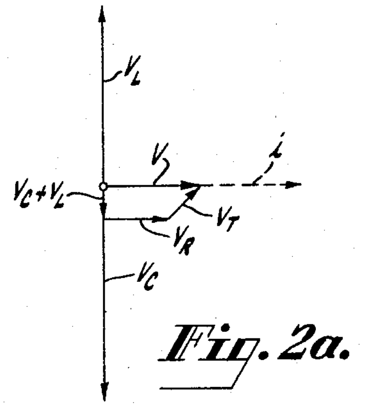
Figure 2B:
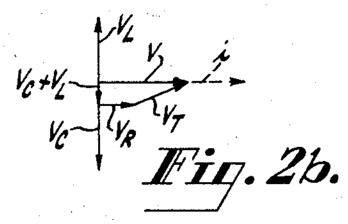

Referring now to the drawing, and in particular to Figures 1, 2*a* and 2*b*, a transfluxor control circuit for a light emitting element, as shown in Figure 1, includes a light emitting element such as an electroluminescent cell 10 connected in series with an inductor 12. An output winding 14 on a transfluxor 16 is also connected in series with the cell 10 and the inductor 12; and the entire circuit is connected across a source of alternating voltage 18. The resistance of the circuit, including the losses in the inductor 12, the losses in the electroluminescent cell 10, which include the effective loss in the cell 10 due to light generation therein, and the losses due to the internal resistance of the source 18 may be lumped into an effective single resistance connected in series with the circuit and illustrated as resistor 20. The output winding 14 of the transfluxor 16 is connected through an output aperture 22 in the transfluxor, and control voltages for the transfluxor are applied through a control aperture 24. A blocking signal is applied to a blocking winding 26 in the control aperture 24 through a pair of blocking intput terminals 28, 30, and a setting signal is applied to a set winding 32 in the control aperture 24 through a pair of setting input terminals 34, 36. The significance of the blocking and setting signals will be fully explained hereinafter.

The frequency of the alternating voltage source 18 is chosen so that the capacitance of the electroluminescent cell 10 and the inductance of the inductor 12 are at series resonance. Under these conditions, small input voltages and currents suffice to cause a large voltage to appear across the electroluminescent cell 10 and the inductor 12 due to the inherent properties of a series resonant circuit. Thus, only a small amount of power is dissipated in the resistor 20. If the electroluminescent cell 10 were driven directly from the source 18 without the interposition of the inductor 12 it would be necessary to dissipate the reactive power of the capacitance of the electroluminescent cell 10 as real power in the source.

The transfluxor operates in a normal transfluxor fashion, as described in the previously mentioned article by Rajchman and Lo. Briefly, however, the voltage drop induced in the output winding 14, subtracts from the voltage of the source 18 in furnishing an input voltage to the resonant circuit comprising the inductor 12 and the capacitance and the electroluminescent cell 10. The voltage across the output winding 14, $V_T$, is controlled by a setting pulse applied to the control aperture 24 of the transfluxor. Control signals may be applied to the transfluxor by applying a blocking signal to the blocking terminals 28, 30 to completely saturate the flux around the output aperture 22. The impedance of the output winding 14 is thus at a minimum and the voltage $V_T$ across the output winding 14 will be at a minimum. The voltage across the electroluminescent cell 10 will therefore be at a maximum and the light output will be at a maximum. A setting signal may be applied to the setting input terminals 34, 36 to reduce the flux around the output aperture 22 and thus effectively increase the impedance of the control winding 14. A larger voltage $V_T$ will thus be developed across the output winding 14 providing a smaller voltage across the electroluminescent cell 10, thus decreasing its light output. The setting signal applied to the setting input terminals 34, 36 may be varied in amplitude to provide a variable light output from the electroluminescent cell 10. If a large enough setting voltage is applied, the impedance of the output winding 14 will become sufficiently high that the voltage across the electroluminescent cell 10 will be insufficient to generate light.

The voltage relations across the various components in the circuit in the blocked or "on" state, that is, when the light output from the electroluminescent cell 10 is the brightest, are shown in Figure 2*a*. The vector V is the voltage of the source 18 and is in phase with the vector *i* which is the current through the circuit of the cell 10. The voltage across the combination of the electroluminescent cell 10 and the inductor 12 is indicated as the small vector $(V_C+V_L)$, the voltage across the resistor 20 is indicated as the vector $V_R$, and the voltage across the control winding 14 is indicated as the vector $V_T$. It will be noted that these vectors are reasonably small and little power will be dissipated in the circuit. It will also be noted that the individual vectors $V_L$ and $V_C$, indicating the individual voltages across the inductor 12 and the electroluminescent cell 10, respectively, are quite large. Thus, a large voltage appears across the electroluminescent cell 10 and a high light output will be obtained. In the set or "off" state of the transfluxor 16 the relationship of the voltages is indicated in Figure 2*b*. It will be noted that the vectors bear somewhat the same relationship. However, the vector $V_T$ has increased with respect to the vector $V_R$ and less voltage is thus applied across the entire series resonant circuit comprising the capacitance of the electroluminescent cell 10 and the inductor 12. The individual voltage across the electroluminescent cell 10, represented by the vector $V_C$, is thus very much smaller and the electroluminescent cell 10 will not emit light.

The transfluxor 16 absorbs energy from the source 18 when the flux is reversed about the output aperture 22 to overcome hysteresis losses in the transfluxor 16. This absorption of energy is at a minimum in the blocked or "on" state and the cell 10 emits the greatest amount of light and the resonant circuit requires the most energy. In the set or "off" state the transfluxor 16 absorbs more energy and the electroluminescent cell brightness and resonant circuit power absorption are decreased. The total power thus required from the source 18 tends to remain constant under conditions of light modulation and the overall efficiency of the circuit is relatively high.

It is to be understood that the light emitting element need not have a large capacitance itself. The impedance of the element may be a more nearly pure resistance, and a capacitor may be connected across the element to provide the resonant operation. The resonant operation will then produce a high voltage for the operation of the element.

It will be noted from the vector diagrams of Figures 2*a* and 2*b* that the input current is the same as if no resonant circuit were present and the same voltage appears across the cell 10. The input voltage is reduced, however, by the ratio of the "Q" of the circuit, as is the required maximum transfluxor voltage drop, $V_T$. The impedance into which the transfluxor must work, that is the relatively high impedance of the electroluminescent cell 10, is reduced by the ratio of the "Q" of the tuned circuit. It has been found in practice, however, that it is still necessary to use a fairly large number of turns on the output winding 14 or a large transfluxor 16 to obtain a satisfactory impedance match.

Figure 3:
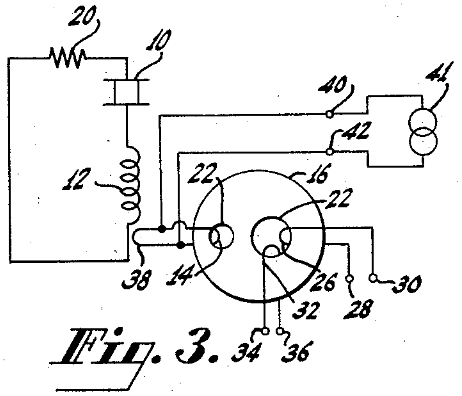
Figure 3 is a schematic circuit diagram of a transfluxor control circuit for an electroluminescent light producing element illustrating another embodiment of the invention.

In order to use smaller transfluxors and fewer output turns on the transfluxor, the circuit shown in Figure 3, which results in a better impedance match, may be used. In this embodiment the output winding 14 of the transfluxor 16 is inductively coupled by a loop 38 to the inductor 12 connected in series with the electroluminescent cell 10. It will be noted also that a voltage source is not connected directly in the series combination of the cell 10 and the inductor 12, but rather a source of alternating current 41 is supplied to a pair of power input terminals 40 and 42, which are connected directly to the loop 38. The remainder of the elements and circuit connections are the same as described with reference to Figure 1. This circuit will operate with only a single turn output loop 14 and 38.

In this embodiment the exciting power for the cell 10 is supplied to the tuned circuit through the loop 38 from an alternating current source 41 applied to the terminals 40, 42. Consider for a moment that the transfluxor is absent from the circuit, no detuning of the resonant circuit will occur and maximum brightness from the cell 10 will be generated if the current source is of high impedance. Now consider that the transfluxor is again connected to the circuit in the set or high impedance state. Some current shunting then will occur through the output winding 14. The impedance of the output winding 14 may be made relatively high so that only a small fraction of the total current applied to the terminals 40, 42 is shunted through the output winding 14. The output winding 14 thus appears as a fairly high effective inductance so that detuning effects on the resonant circuit are small. In this condition a maximum amount of light will be produced by the electroluminescent cell 10 with only a moderate increase in power in order to overcome the losses in the transfluxor.

Figure 4:
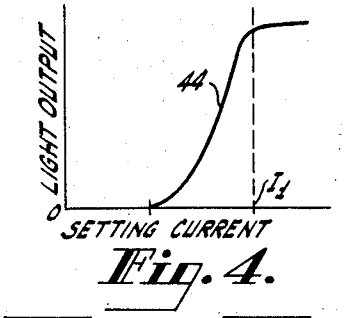
Figure 4 is a graph showing a curve illustrating certain operating conditions of the circuit of Figure 3.

If the setting current is small, however, so that the transfluxor remains blocked, little flux change can occur around the output aperture 22. Almost all of the current applied to the terminals 40, 42 will now be shunted through the output winding 14. Little voltage will thus appear across the resonant circuit and electroluminescent cell 10 and no light will be produced by the cell 10. The light output of the cell 10 as a function of a setting current applied to the set winding 34 and 36 is illustrated in Figure 4 by the curve 44, which indicates that complete control of the light output from the electroluminescent cell 10 is obtainable.

It will be noted that in the blocked state of the transfluxor 16 little energy is absorbed by the transfluxor 16 and little energy is allowed to reach the tuned circuit; whereas in the set state considerable energy is absorbed in the transfluxor 16. The power regulation of the circuit is therefore not as good as the previous circuit, but with proper design of the power source this does not impose a serious limitation.

A method of overcoming this relatively poor regulation is to operate the circuit of Figure 3 in another mode. When the transfluxor 16 is in the blocked state, little output voltage can occur, and the inductance of the output winding 14 appears small. This inductance is of high "Q" however, because little power is dissipated in the transfluxor 16. By driving the circuit from the source 41 operating at a higher frequency, it is still possible to bring the circuit into resonance with this smaller value of inductance, and to obtain large cell voltage and light output. If now the transfluxor 16 is set to be partially or wholly unblocked, the effective inductance across the output winding 14 will increase, and the circuit will be shown out of resonance, reducing the output light. The power dissipated in the transfluxor 16 will now increase, at the expense of output light. Thus, in this mode, the regulation again is good, and the circuit becomes easier to drive. The operating frequency is higher than for the previous mode of operation described, however.

In the circuit shown in Figure 3, in both modes of operation, the voltage across the output winding 14 and the current through the series resonant circuit are out-of-phase and the reactive power component is relatively large. This is not a particular disadvantage because a favorable impedance transformation may be obtained at the power input points. This additional reactive component may be eliminated by additional resonating circuit components 52, 54 as shown in the array of circuits in Figure 5.

Figure 5:
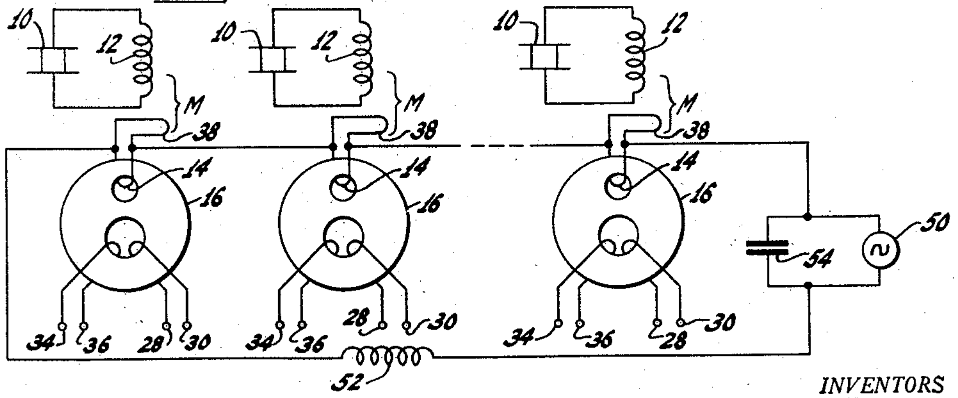
Figure 5 is a schematic circuit diagram of an array of electroluminescent elements having transfluxor control circuits in accordance with the invention.

Referring now to Figure 5, a series of electroluminescent cells 10 each with its associated resonating inductors 12 is connected in a closed circuit and each driven from single loop turns 38 connected to output windings 14 of the series of transfluxors 16. The set and block signals are applied to the set and block input terminals 34, 36 and 28, 30 in the same manner as has been previously described in connection with Figure 3. The exciting power is supplied to the loop turns 38 in series from a voltage source 50. An inductor 52 is connected in series with the loop turns 38 and a capacitor 54 is shunted across the voltage source 50. The inductor 52 and the capacitor 54 are resonated at the operating frequency to eliminate the reactive component of power described with reference to Figure 3. This additional compensation need only be provided for groups of elements, so that for a display panel only a relatively few additional resonant circuits would be required. This is made possible because the voltage drop across the output windings 14 of each individual operating element will be small when single or only a few turns are used on these windings, and a large number can be operated in series without requiring a large voltage drop. If the voltage across the inductor 52 is made large with respect to the voltage drop across the individual loop turns 38, an effectively constant current drive for the transfluxors will be obtained and the resonant frequency of the system will then be nearly independent of the average modulation of the individual elements. Because of the parallel resonant circuit of the inductor 52 and the capacitor 54, as indicated in Figure 5, shifts in the resonant frequency of the system that may occur as a result of modulation effect the magnitude of the current supplied to the windings 38 by means of the inductor 52 only to a slight extent. The only effect of such resonant frequency shifting is to produce slight differences in phase between the source current and voltage. By making the voltage source of sufficiently low impedance, these differences in a practical circuit can be neglected.

What is claimed is:

1. A control circuit for a light producing element requiring a relatively large voltage for operation comprising in combination, means providing a source of alternating operating power having a predetermined frequency for energizing said element, inductor means connected in series with said element, means associated with said element to provide a series resonant circuit with said inductor means at said predetermined frequency, and coupling means including a transfluxor device for controlling the application of power from said source to said series resonant circuit.

2. A control circuit for a light producing element requiring a relatively large voltage for operation comprising in combination, means providing a source of alternating operating power having a predetermined frequency for energizing said element, an inductor, means providing a series resonant circuit at said predetermined frequency including a connection between said element and said inductor, and coupling means including a transfluxor device for controlling the application of power from said source to said series resonant circuit.

3. A control circuit for an electroluminescent light producing element having a relatively large capacitance comprising in combination, a source of operating alternating power for energizing said electroluminescent element, inductor means serially connected with said electroluminescent element to provide with the capacitive reactance of said element a series resonant circuit at the frequency of said source of power, and transfluxor means connected between said source and said series resonant circuit for controlling the application of power to said element through said series resonant circuit.

4. A control circuit for a light producing element requiring a relatively high voltage for operation comprising in combination, a source of operating power for energizing said element, said operating power having a predetermined frequency; an inductor; means providing a series resonant circuit at the frequency of said source including a connection between said element and said inductor; a transfluxor having a control aperture and an output aperture; means for coupling said source and said series resonant circuit through said output aperture; and means connected with said control aperture for varying the coupling between said source and said series resonant circuit.

5. A control circuit for a light producing element as defined in claim 4 wherein said means for coupling said source and said series resonant circuit through said output aperture comprises a single turn inductive coupling linking said inductor and said output aperture.

6. A control circuit for an electroluminescent light producing element having a relatively large capacitance comprising in combination, a source of energizing power for said electroluminescent element having a predetermined frequency, an inductor element connected in series with said electroluminescent element having an inductance value to provide with the capacitance of said electroluminescent device a series resonant circuit at said predetermined frequency, a transfluxor having a control aperture and an output aperture, an output winding in said output aperture, means for connecting said output winding between said source of power and said electroluminescent element, and control winding means connected with said control aperture for varying the effective impedance of said output winding.

7. A control circuit for a plurality of light producing elements, each requiring a relatively large voltage for operation comprising in combination, a plurality of transfluxor devices, each of said devices having an output aperture and a control aperture; a source of operating power for said elements having a predetermined frequency; a plurality of inductors; means providing a plurality of series resonant circuits at the frequency of said source including an individual connection between each of said inductors and one of said elements; a plurality of output windings each individually connected to an output aperture of one of said transfluxors; means for individually coupling each of said output windings to one of said series resonant circuits; an additional inductor; means for connecting said output windings and said additional inductor in series across said source of operating power; a capacitor connected across said source and having a capacitance value to form with said additional inductor an additional resonant circuit at the frequency of said source; and a plurality of control winding means each connected individually to the control aperture of one of said transfluxors to selectively control the application of power from said source to said series resonant circuits.

No references cited.